United States Patent [19]
Zimmermann

[11] Patent Number: 5,257,014
[45] Date of Patent: Oct. 26, 1993

[54] ACTUATOR DETECTION METHOD AND APPARATUS FOR AN ELECTROMECHANICAL ACTUATOR

[75] Inventor: Daniel E. Zimmermann, Peoria, Ill.

[73] Assignee: Caterpillar Inc., Peoria, Ill.

[21] Appl. No.: 785,724

[22] Filed: Oct. 31, 1991

[51] Int. Cl.⁵ .................. G08B 21/00; G01B 7/14
[52] U.S. Cl. .......................... 340/686; 137/554; 324/207.2; 324/207.22
[58] Field of Search .............. 340/686; 137/554; 310/68 B, 12, 13, 15; 318/135; 324/207.2, 207.22, 207.24; 251/129.01

[56] References Cited

U.S. PATENT DOCUMENTS

| 3,178,151 | 4/1965 | Caldwell | 251/137 |
|---|---|---|---|
| 4,319,236 | 3/1982 | Brace et al. | 340/679 |
| 4,434,450 | 2/1984 | Gareis | 361/152 |
| 4,450,427 | 5/1984 | Gareis | 338/32 H |
| 4,585,978 | 4/1986 | Hasselmark et al. | 318/118 |
| 4,656,400 | 4/1987 | Pailthorp et al. | 318/135 |
| 4,659,968 | 4/1987 | Stupak, Jr. | 318/128 |
| 4,665,348 | 5/1987 | Stupak, Jr. | 318/135 |
| 4,698,608 | 10/1987 | Kimble | 335/222 |
| 4,808,955 | 2/1989 | Godkin et al. | 335/222 |
| 4,892,328 | 1/1990 | Kurtzman et al. | 280/707 |
| 4,912,343 | 3/1990 | Stuart | 310/14 |
| 4,969,662 | 11/1990 | Stuart | 280/707 |
| 5,012,722 | 5/1991 | McCormick | 91/361 |
| 5,032,812 | 7/1991 | Banick et al. | 335/17 |
| 5,069,422 | 12/1991 | Kawamura | 251/129.1 |

FOREIGN PATENT DOCUMENTS 612045 3/1978 U.S.S.R. .................. 137/554

OTHER PUBLICATIONS

Aura Systems, Inc., The Aura Systems High Force Actuator, El Segundo, Calif., Jun. 1990.

Primary Examiner—Thomas Mullen
Attorney, Agent, or Firm—David M. Masterson

[57] ABSTRACT

An electromagnetic actuator is disclosed. The actuator includes a core, and a cylindrical shell disposed around the core defining an annular space therebetween. A signal device produces a desired position signal. A direct current amplifier transmits an energization signal in response to the desired position signal. A coil disposed in the annular space has a plurality of windings. The coil is adapted to receive the energization signal and responsively produce a magnetic field about the coil proportional to the magnitude of the energization signal causing one of the coil and the core to move relative to the other. A sensing device is adapted to detect the magnetic field produced by the energized coil. The sensing device responsively produces a sensed position signal correlative to the magnitude of the magnetic field. A signal conditioning circuit receives the sensed position signal and responsively produces an actual position signal indicative of the position of the moving one of the coil and the core relative to the other of the coil and the core.

20 Claims, 2 Drawing Sheets

ACTUATOR DETECTION METHOD AND APPARATUS FOR AN ELECTROMECHANICAL ACTUATOR

DESCRIPTION

1. Technical Field

This invention relates generally to a position detection method for an electromechanical actuator and, more particularly, to a position detection method which detects the magnetic flux produced by an energized coil associated with an electromechanical actuator.

2. Background Art

Typically linear actuators are electromechanical devices that provide linear mechanical motion in response to receiving electrical energy. Linear actuators may be utilized in many high-force and high-precision applications. To provide for closed loop feedback control of such actuators it is desirable to measure the position of the moveable portion of the actuator.

One example of a linear actuator is shown in U.S. Pat. Nos. 4,892,328, 4,969,662 by Kurtzman et al. and Stuart, respectively. The linear displacement of the actuator disclosed is sensed by using a linear voltage differential transformer (LVDT). The LVDT generally includes a primary winding wound coaxially about a transformer. The primary winding is provided with a center tap. A secondary winding is generally provided as two separate windings. The windings are wound coaxially about the transformer and are axially spaced in a symmetrical manner at opposite ends of the primary winding. A rod, made of a magnetically conductive material, is attached to the core and is linearly moveable therewith. The primary winding is excited with an AC signal so that an induced voltage can be measured in each of the secondary windings, as the core member and consequently the rod moves in a linear motion. Therefore the position of the core may be known.

However, problems may occur by using the LVDT design in conjunction with linear actuators. For example, the linear response of the actuator slows somewhat due to the added mass of the LVDT rod which is attached to the core. The accuracy of the positioning circuitry may be inconsistent because the magnetic field produced by the energized coil may interfere with the operation of the LVDT. Moreover, assembling the LVDT in combination with the linear actuator adds complexity, because many additional manufacturing steps are required by adding the LVDT. Further the LVDT design adds additional cost due to the high cost of a transformer. Finally since the LVDT sensor enlarges the overall size of the actuator, mounting the actuator becomes cumbersome.

Another linear actuator is disclosed by Stupak et al. in U.S. Pat. Nos. 4,665,348, 4,659,969, and 4,656,400. The actuator shown in Stupak et al. is a variable reluctance actuator generally known as a solenoid. The solenoid consists of a plunger disposed inside a cylindrical casing. The plunger is mounted for slidable movement relative to the casing. Typically, the plunger is made of soft iron. A coil comprising one or more layers of windings of an electrical conductor is disposed inside the casing. The coil is wound as a helix around the plunger. An air gap exists between an end of the plunger and an end cap which is adjacent to an end of the casing. The air gap is the primary source of reluctance. Current applied to the coil generates a magnetic field which moves the plunger relative to the casing. Moreover, a flux path is developed in conjunction with a magnetic circuit. The magnetic circuit includes the casing and the end cap. A Hall effect sensor is located in the magnet circuit, i.e. directly in the path of the of the magnetic flux. More particularly, a spacer is disposed in between the end of the casing and the end cap providing a space. The sensor is positioned in the space.

The solenoid disclosed by Stupak varies in reluctance. This is caused by the plunger, which is part of the magnetic circuit, moving in response to the magnetic field. When the plunger moves, the reluctance of the magnetic circuit varies, i.e. the dimensions of the air gap changes. It is well known that variable reluctance actuators or solenoids produce non-linear force characteristics. Non-linear force characteristics are undesirable because these characteristics lead to difficult control of the solenoid. Consequently, Stupak utilizes the Hall sensor as part of a feedback scheme to achieve greater control of the solenoid. However, the feedback scheme utilizes complex circuitry and is therefore costly.

The present invention is directed to overcoming one or more of the problems as set forth above.

DISCLOSURE OF THE INVENTION

In one aspect of the present invention, an electromagnetic actuator is disclosed. The actuator includes a core, and a cylindrical shell disposed around the core defining an annular space therebetween. A signal device produces a desired position signal. A direct current amplifier transmits an energization signal in response to the desired position signal. A coil disposed in the annular space has a plurality of windings. The coil is adapted to receive the energization signal and responsively produce a magnetic field about the coil proportional to the magnitude of the energization signal causing one of the coil and the core to move relative to the other. A sensing device is adapted to detect the magnetic field produced by the energized coil. The sensing device responsively produces a sensed position signal correlative to the magnitude of the magnetic field. A signal conditioning circuit receives the sensed position signal and responsively produces an actual position signal indicative of the position of the moving one of the coil and the core relative to the other of the coil and the core.

BRIEF DESCRIPTION OF THE DRAWINGS

For a better understanding of the present invention, reference may be made to the accompanying drawings in which.

BEST MODE FOR CARRYING OUT THE INVENTION

Figure 1:
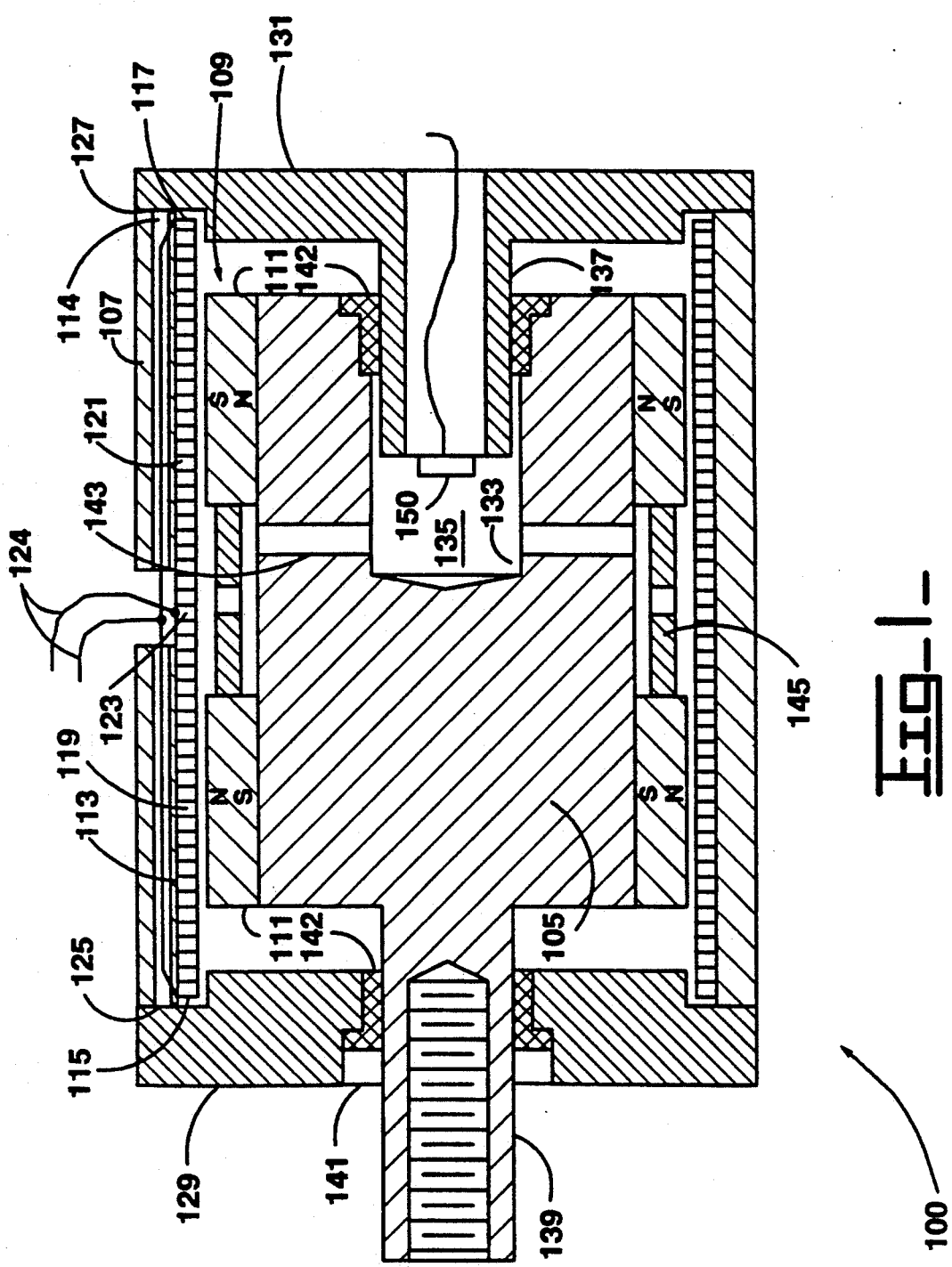
FIG. 1 is a cross sectional view of an electromagnetic actuator incorporating aspects of the present invention.

Referring to FIG. 1 a cross sectional view of an electromechanical actuator is shown. The actuator 100 consists of a cylindrical core 105 that is free to move axially. An annular space is formed between the cylindrical core 105 and a cylindrical shell 107 that surrounds the core 105. Preferably the core 105 and the shell 107 are made of soft iron. A magnetic assembly 109 is disposed about the core 105. More particularly, the magnetic assembly 109 includes a pair cylindrical magnets 111 made from permanent magnetized material. The cylindrical magnets 111 are contiguous with the core 105 and each one of the pair is disposed at opposite ends of the core 105. Preferably the cylindrical magnets 111 are radially magnetized and orientated on the core 105 such that the magnetic cylinders 111 are opposite in polarity. The magnetic cylinders 111 are affixed to the core 105 by a well known cementing process. The magnets 111 are made from a rare earth material and each magnet may be comprised of a plurality of individual, sectional magnets assembled to form a cylinder, as is well known. Additionally, a steel ring (not shown) may be positioned around each magnet pair securing the magnets to the core. The steel rings are especially useful for sectional-type magnets.

A coil 113 is disposed in the annular space and is electrically insulated from the shell 107. The coil 113 comprises one or more layers of windings of an electrical conductor wound in a common direction forming a helix. A first end 115 of the coil 113 is connected to a second end 117 of the coil 113, forming an end connection. An intermediate portion 123 of the coil 113 is positioned between first and second end portions 119,121. The shell 107 includes a channel 114 partially filled with nonconductive material allowing the end connnection to be electrically isolated from the coil 113 and the shell 107. The coil 113 has electrically connectable leads 124 at the end connection and the intermediate portion. Thus, the coil is said to be center tapped. Alternately, the coil 113 may be comprised of two separate coils connected in series, where each coil is wound in opposite directions. The manner of winding the coil 113 is not critical to the present invention.

The cylindrical shell 107 has first and second ends 125,127. First and second end plates 129,131 are positioned adjacent the first and second ends 125,127 of the shell 107, respectively. Preferably the first and second end plates 129,131 are fastened to the shell 107 by a set of screws (not shown). The core 105 includes a bore 133 which defines a cylindrical space 135. The second end plate 131 has a cylindrical extension 137 adapted to be engageable with the bore 133 of the core 105. Advantageously, a sensing device 150 is disposed in the bore 133. The sensing device 150 is mounted on an end of the cylindrical extension 137.

Additionally, the core 105 includes a cylindrical extension 139. The cylindrical extension 139 is engageable with a bore 141 of the first end plate 129. The core 105 and the second end plate 129 each include a bushing disposed in the respective bores 133,141. Preferably the bushings 142 are made of a suitable material such as bronze or the like. A cylindrical passage 143 is drilled radially through the core 105 which extends through the bore 133. The passage allows air to travel from the cylindrical space 135 to the periphery of the core 105. Moreover, the actuator may include a spacer 145, made of aluminum, positioned between the cylindrical magnets 111. Finally, the actuator 100 may employ the use of O-rings (not shown) positioned contiguous with the end plates 129,131 and adjacent the core 105. The O-rings act as stops for the movable core 105.

Figure 2:
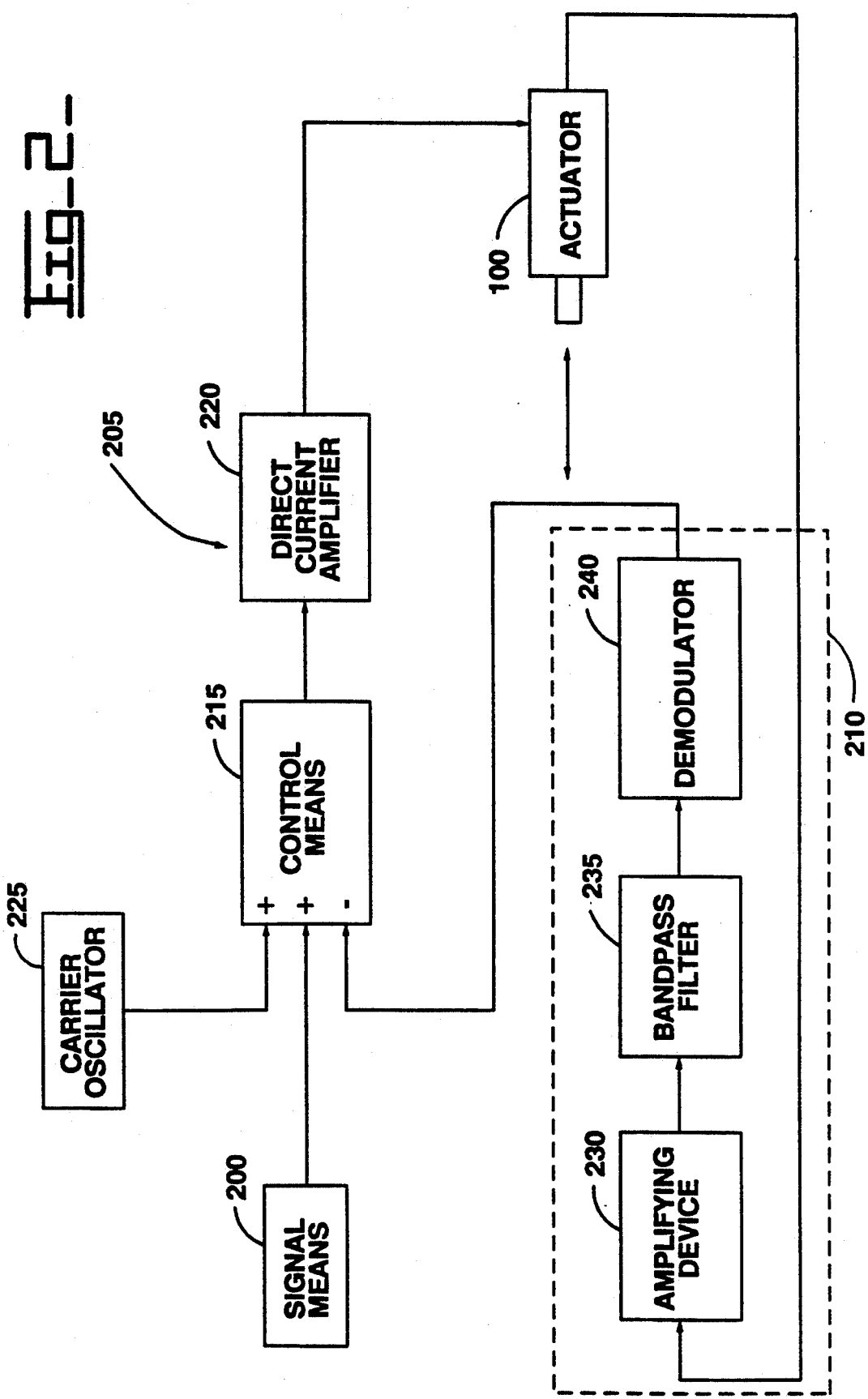
FIG. 2 is a functional illustration of the control structure associated with the present invention.

FIG. 2 is a block diagram of the control structure for the actuator 100. A signal means 200 produces a desired position signal. A driving means 205 transmits an energization signal to the coil 113 in response to the desired position signal. Advantageously, the driving means 205 is connected to the leads 124 of the coil 113 so that current travels through the first end portion 119 in one direction, clockwise for example, and the current travels through the second end portion 121 in an opposite direction, counterclockwise for example. In other words the driving means 205 is connected to the leads 124 of the coil 113 providing for the energization signal to travel through the windings of the coil 113 wherein the direction of current flow within each end portion 119,121 is opposite in direction relative to the other. Consequently, a magnetic field proportional to the magnitude of the energization signal is generated. Therefore the force generated by the energization signal travelling through the coil 113 is additive with respect to the static magnetic field generated by the permanent magnets, yielding a high force causing the core 105 to move. The core 105 is moveable in first and second directions relative to the coil 113 in response to the orientation of the energization signal.

The sensing device 150 is adapted to detect the magnetic field produced by the energized coil. Responsively the sensing device 150 produces a sensed position signal correlative to the magnitude of the magnetic field. However, the sensing device 150 does not detect the static magnetic field produced by the magnets 111. The sensing device 150 produces the sensed position signal in response to the magnetic flux density introduced to the cylindrical space 135. The magnetic flux density introduced to the cylindrical space 135 is proportional to the movement of the core 105. For example, a greater or lesser amount of magnetic flux density is introduced to the cylindrical space 135 depending on the range of movement of the core 105. Correspondingly as the dimensions of the cylindrical space 135 increase, the sensing device 150 increases the magnitude of the sensed position signal. It should be noted that the accuracy of the signal produced by the sensing device 150 corresponds to the physical geometry of the cylindrical space 135. In the preferred embodiment, the sensing device is a hall effect sensor available from Allegro Microsystems, Inc. as part no. UGS3503UA.

A signal conditioning means 210 receives the sensed position signal from the sensing device 150 and responsively produces an actual position signal which is indicative of the relative position of the core 105. A control means 215 receives the actual position signal and the desired position signal and produces an error signal responsive to a difference between the desired position signal and a sensed position signal. Correspondingly the driving means 205 transmits the energization signal in response to the error signal, causing the error signal to approach zero.

The driving means 205 includes a direct current amplifier 220. Further, the control means 215 adds a carrier oscillator frequency signal to the error signal. The direct current amplifier 220 is adapted to deliver the energization signal to the actuator 100 at the carrier frequency. The choice of the frequency of the carrier signal is high enough above the mechanical frequency response of the actuator 100 reducing the hysteresis or the dead band of the actuator 100. A typical frequency for the carrier signal is 200 Hz, for example.

The direct current amplifier 220 is adapted to measure the magnitude of the current applied to the coil, i.e. the energization signal. Advantageously the direct current amplifier 220 adjusts the energization signal in response to resistive changes associated with the electrical conductor of the coil 113. The resistance associated with the electrical conductor may vary as the temperature of the electrical conductor varies. Thus, the magnetic field generated by the energized coil 113 and the corresponding magnetic force is held to predetermined values corresponding to predetermined magnitudes of the energization signal.

The signal conditioning means 210 includes an amplifying device 230 which is adapted to receive the sensed position signal from the sensing device 150 and responsively amplify magnitude thereof. The signal conditioning means 210 further includes a band pass filter 235 adapted to receive the amplified signal and responsively pass the portion of the amplified signal which corresponds to the frequency of the carrier frequency, producing a filtered signal. Moreover the signal conditioning means 210 includes a de-modulator 240 adapted to receive the filtered signal and responsively produce a direct current level signal from the filtered signal. The direct current signal is the actual position signal. The amplifying device 230, band pass filter 235 and de-modulator 240 are each well known in the art and no further discussion need be made.

Industrial Applicability

Referring to FIGS. 1 and 2, an example is given to best illustrate the features and advantages of the present invention. Signal means 220 delivers the desired position signal, indicative of the desired position of the core 105, to the control means 215. A carrier oscillator 225 which produces a carrier signal at a frequency of 200 Hz is delivered to the control means 215. Responsive to the desired position signal, the direct current amplifier 220 produces an energization signal to the coil 113. In responsive to the energization of the coil 113 a magnetic flux density is introduced to the cylindrical space 135. The sensing device 150 detects the magnetic flux introduced in the cylindrical space and responsively produces a sensed position signal proportional to the magnetic flux density. A signal conditioning means 210 receives the sensed position signal, conditions the received signal, and produces an actual position signal indicative of the position of the core 105. In other words, the sensed position signal produced by the sensing device 150 is a A.C. voltage signal which is amplified, filtered, and de-modulated by the signal conditioning means 210 producing the actual position signal. Consequently, the control means 215 receives the actual position signal and the desired position signal and produces an error signal which is delivered to the direct current amplifier 220 along with the carrier frequency. Responsively the direct current amplifier 220 delivers the energization signal at the carrier frequency to the coil 113, thereby causing the error signal to approach zero.

Note that the position detecting apparatus detects the position of the core 105 through any range movement. As would become evident to those skilled in the art, the position detecting apparatus is suited not only for detecting the position of a moving core actuator design but also may be implemented to detect the position of a moving coil actuator design.

Other aspects, objects and advantages of the present invention can be obtained from a study of the drawings, the disclosure and the appended claims.

I claim:

1. An electromagnetic actuator, comprising:
a core having a bore defining a cylindrical space;
a cylindrical shell disposed around said core defining an annular space therebetween and having first and second ends;
signal means for producing a desired position signal;
driving means for transmitting an energization signal in response to said desired position signal;
a coil disposed in said annular space having a plurality of windings, said coil being adapted to receive said energization signal and responsively produce a magnetic field about said coil proportional to the magnitude of said energization signal causing one of said coil and said core to move relative to the other;
a sensing device disposed in the bore of said core and adapted to detect the magnetic field introduced in the cylindrical space and responsively produce a sensed position signal proportional to the magnetic flux density passing through the cylindrical space, the magnetic flux density passing though the cylindrical space being proportional to the movement of one of said coil and said core; and
signal conditioning means for receiving said sensed position signal and responsively producing an actual position signal indicative of the position of the moving one of said coil and said core relative to the other of said coil and said core.

2. An electromagnetic actuator, as set forth in claim 1, wherein said core is cylindrical and moves linearly either in a first or a second direction relative to the coil.

3. An electromagnetic actuator, as set forth in claim 2, wherein said core includes a pair of cylindrical magnets contiguous with said core, one of the pair being positioned at one end of said core and the other of the pair being positioned at the other end of said core.

4. An electromagnetic actuator, as set forth in claim 3, including a control means for receiving said actual position signal and said desired position signal and producing an error signal responsive to a difference between said desired position signal and said sensed position signal.

5. An electromagnetic actuator, as set forth in claim 4, wherein said driving means transmits said energization signal in response to said error signal, causing said error signal to approach zero.

6. An electromagnetic actuator, as set forth in claim 5, wherein said driving means includes a direct current amplifier.

7. An electromagnetic actuator, as set forth in claim 6, wherein said direct current amplifier has a carrier frequency beyond the mechanical frequency response of said actuator.

8. An electromagnetic actuator, as set forth in claim 7, wherein said signal conditioning means includes an amplification device adapted to receive said sensed position signal and responsively amplify the magnitude thereof.

9. An electromagnetic actuator, as set forth in claim 8, wherein said signal conditioning means includes a bandpass filter adapted to receive said amplified signal and responsively pass the portion of said amplified signal which corresponds to the range of the carrier frequency, producing a filtered signal.

10. An electromagnetic actuator, as set forth in claim 9, wherein said signal conditioning means includes a demodulator adapted to receive the filtered signal and responsively produce a direct current level signal from the filtered signal, said direct current level signal being said actual position signal.

11. An electromagnetic actuator, as set forth in claim 3, including first and second end plates positioned adjacent the first and second ends of said shell, respectively.

12. An electromagnetic actuator, as set forth in claim 11, wherein said second end plate has a cylindrical extension adapted to be engageable with the bore of said core.

13. An electromagnetic actuator, as set forth in claim 12, wherein said sensing device is mounted on an end of the cylindrical extension.

14. A method for controlling an electromagnetic actuator, said actuator including a core having a bore defining a cylindrical space, a cylindrical shell disposed around said core defining an annular space therebetween, a coil disposed in said annular space having a plurality of windings, and an amplifier for producing an energization signal, said coil being adapted to receive said energization signal and responsively produce a magnetic field about said coil proportional to the magnitude of said energization signal causing one of said coil and said core to move relative to the other, comprising the steps of:

producing a desired position signal;

transmitting an energization signal in response to said desired position signal;

detecting the magnetic field introduced in the cylindrical space and responsively producing a sensed position signal proportional to the magnetic flux density passing through the cylindrical space, the magnetic flux density passing through the cylindrical space being proportional to the movement of one of said coil and said core; and receiving said sensed position signal and responsively producing an actual position signal indicative of the position of one of said coil and said core relative to the other of said coil and said core.

15. A control method, as set forth in claim 14, including the steps of receiving said actual position signal and said desired position signal and producing an error signal responsive to a difference between said desired position signal and said sensed position signal.

16. A control method, as set forth in claim 15, wherein the step of transmitting said energization signal is in response to said error signal.

17. A control method, as set forth in claim 16, wherein said energization signal is a direct current signal with a carrier frequency beyond the mechanical frequency response of said actuator.

18. A control method, as set forth in claim 17, including the steps of receiving said sensed position signal and responsively amplifying the magnitude thereof.

19. A control method, as set forth in claim 18, including the steps of receiving said amplified signal and responsively passing the portion of said amplified signal which corresponds to the range of the carrier frequency, producing a filtered signal.

20. A control method, as set forth in claim 19, including the steps of receiving the filtered signal and responsively producing a direct current level signal from the filtered signal, said direct current level signal being said actual position signal.

* * * * *

UNITED STATES PATENT AND TRADEMARK OFFICE
CERTIFICATE OF CORRECTION

PATENT NO. : 5,257,014

DATED : October 26, 1993

INVENTOR(S) : Daniel E. Zimmermann

It is certified that error appears in the above-identified patent and that said Letters Patent is hereby corrected as shown below:

On title page, item [54] and col. 1, lines 2-4, the title should read "POSITION DETECTION METHOD AND APPARATUS FOR AN ELECTROMECHANICAL ACTUATOR".

Signed and Sealed this

Sixteenth Day of May, 1995

Attest:

BRUCE LEHMAN

*Attesting Officer*　　　*Commissioner of Patents and Trademarks*